United States Patent

Ewe et al.

[11] 4,210,853
[45] Jul. 1, 1980

[54] CONTROL DEVICE WITH AN INTEGRATING POSITION DRIVE

[75] Inventors: Kurt Ewe; Edmund Linzenkirchner, both of Karlsruhe, Fed. Rep. of Germany

[73] Assignee: Siemens Aktiengesellschaft, Munich, Fed. Rep. of Germany

[21] Appl. No.: 912,985

[22] Filed: Jun. 6, 1978

[30] Foreign Application Priority Data

Jun. 10, 1977 [DE] Fed. Rep. of Germany ....... 2726112

[51] Int. Cl.² .............................................. G05B 11/01
[52] U.S. Cl. ..................................... 318/630; 318/621
[58] Field of Search ................ 318/630, 616, 617, 621

[56] References Cited

U.S. PATENT DOCUMENTS

| | | | |
|---|---|---|---|
| 3,072,835 | 1/1963 | Maeda | 318/630 X |
| 3,394,294 | 1/1968 | Leroi et al. | 318/630 X |
| 3,896,361 | 7/1975 | Inaba et al. | 318/616 |

*Primary Examiner*—B. Dobeck
*Attorney, Agent, or Firm*—Kenyon & Kenyon

[57] ABSTRACT

In a control device which includes an integrating positioning drive comprising a motor and transmission with backlash and lag, the backlash being the hysteresis of the transmission of mechanical quantities which occurs when the direction of rotation changes and which is caused, for example, by gear tolerances in the transmission due to manufacturng constrains, in addition to a first feedback path which supplies a signal proportional to the position of a control member, there is also provided a second feedback path developing a signal dependent on the positioning rate and the magnitude of the lag in the motor and, the mechanical members of the positioning drive are designed in such a manner that the transmission lag which occurs is greater than the sum of the position changes of the control member during starting of the positioning member over the period from stand-still to reaching its nominal speed and the position change occuring during the lag after the positioning motor is deenergized, providing a control device which can be used in applications which require high positioning rate as well as extremely small positioning steps.

4 Claims, 2 Drawing Figures

CONTROL DEVICE WITH AN INTEGRATING POSITION DRIVE

BACKGROUND OF THE INVENTION

This invention relates to control systems in general and more particularly to a control system which provides improved positioning accuracy at high positioning rates.

Control devices which have an integrating positioning drive, e.g., motor and gear train, which has backlash and which exhibits a lag, i.e., a period over which the drive moves after it is deenergized and which includes a feedback input providing a signal proportional to the position of a member being controlled are known. The typical integrating positioning drive includes a positioning motor, preferably an electric motor having a reduction gear which can comprise several stages. The reduction gear transforms the relatively high speed of the positioning motor into the linear or angular motion required for moving a controlled member, for example, a damper or a gate valve, through its positioning range. However, in addition to electric motors pneumatic or hydraulic positioning drives which are controlled by pulse sequences, and are thus actuated in a stepwise manner, can also be considered within the scope of the present invention. In these latter devices, the transmission path can also include backlash.

For control reasons, positioning drives for control purposes should be capable of high positioning rates and of high resolution in positioning.

It is relatively simple to achieve high positioning rates. However, to achieve such and at the same time insure that the control member reaches a predetermined set position accurately necessitates a relatively complex system for braking the positioning drive. Theoretically, a control system should respond even to very small changes of the input variable to the control device. In other words, very small control differences must be converted into a corresponding change of the variable, i.e., the position of the control member. In practice, particularly in large positioning drives, this requirement cannot be realized since positioning motors cannot be built without inertia. As a result the motor cannot convert arbitrarily short positioning pulses into rotary motion and therefore, into positioning travel. Furthermore, because of the large starting currents which electric motors draw, the motor should also not be switched off during the starting phase. That is to say, it should not be switched off from the time it is switched on until it has reached its nominal speed, in order to save the contacts of the switching devices and to avoid excessive heating. For these reasons, the switching pulses supplied at the controller output must not fall below a minimum duration. In turn, the minimum "on" time also determines the smallest possible positioning steps for drives without backlash and therefore, the positioning travel resolution which is possible.

If a positioning motor does not immediately stop after being deenergized, but continues to run down slowly because of its rotational energy, this lag further increases the positioning steps. The magnitude of this lag depends on the size of the motor, the speed, the friction forces of the transmission and the load torque. In order to avoid such uncontrollable lag of the positioning motor, electric motor control drives presently employed in the process industry are frequently equipped with electromechanical or electronic braking devices. However, these devices are relatively expensive and/or are subject to wear.

In the case of electric motor positioning drives using electromechanical brakes, the minimum "on" pulse length therefore must be equal to or greater than the sum of the pickup delay of the power switching device, the time required for the motor to reach operating speed and the lifting time of the brakes. In practice, the minimum pulse length is about 200 ms. In electronic braking devices and solid-state power switches, the minimum "on" time is 50 to 100 ms, depending on the size of the motor.

If, the smallest positioning step should, for instance, not exceed 0.3% of the positioning range, positioning times of more than 15 seconds for the full positioning range would be obtained with the minimum "on" times mentioned. However, such positioning times are too long for dynamically controlling control systems with time constants on the order of 1 s, for instance, flow or pressure control systems.

Thus, the problem, of improving a control device of the type mentioned at the outset, in such a manner that a high positioning rate as well as an extremely high resolution are achieved, arises.

SUMMARY OF THE INVENTION

The present invention provides a solution to this problem. In a control device which has an integrating position drive which includes transmission backlash and lag, and which also has a feedback input supplying a signal proportional to the position of the control member, this problem is solved by having a second feedback path supplying a signal which is proportional to the positioning rate and is weighted or scaled in accordance with the lag, and by designing the system so as to have a transmission backlash which is greater than the sum of the position change of the control member occuring during starting of the positioning motor until it reaches it nominal speed and the position change occuring during lag, assuming the drive had no backlash. The second feedback signal which is proportional to the positioning rate causes the positioning motor to be switched off shortly before the desired position is reached and the final amount of motion to the desired position occurs because of the lag in the system.

In contrast to what is the customary practice of taking, what are often rather expensive measures to keep mechanical backlash in the operation of positioning drives as small as possible, the present invention utilizes a transmission in which backlash is desired and is built into the system. Typically this backlash can be on the order of 2% of positioning range. The positioning travel resolution can be made as high as desired if the switching frequency is not limited.

In a specifically illustrated embodiment of the present invention the control devices comprises a discontinuous or quasi-continuous controller with a multipoint switching member, the lowest threshold of which is set lower than the change of input variable of the control device, which corresponds to the position change due to the start and lag.

DETAILED DESCRIPTION OF THE INVENTION

Figure 1:
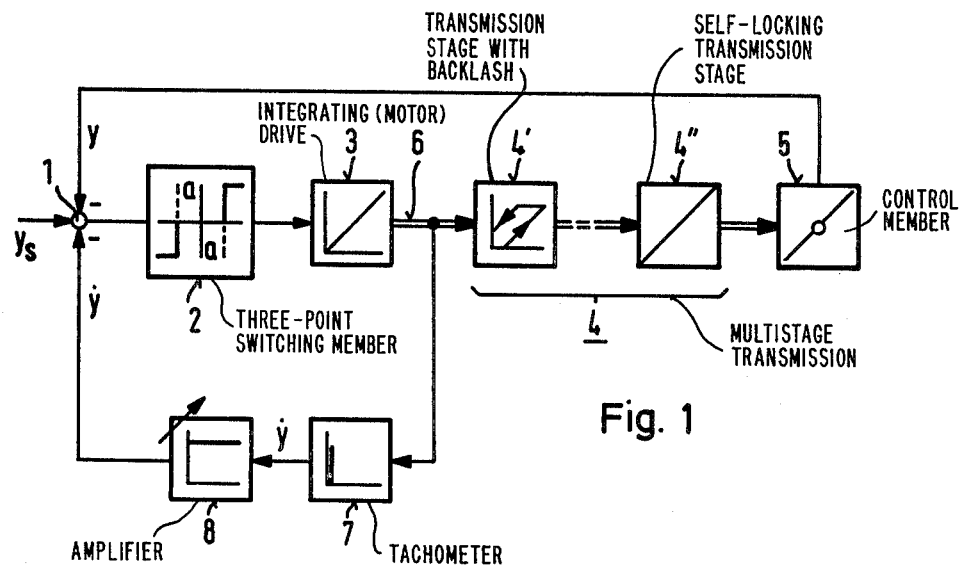
FIG. 1 is a block diagram of a first position control loop according to the present invention.

As illustrated by FIG. 1, a desired position $y_s$ forms a first input to a summing junction 1. At summing junction 1, this signal is differenced with a feedback signal y representing the actual position of the control member. Also fed to the summing junction with the same sign as the signal y is the signal ẏ representing the positioning rate. The result out of the summing junction 1 is an error signal representative of the error between the desired position $y_s$ and the actual position y with an additional factor imposed thereon by the rate signal ẏ to take into account lag. This error signal is the input to a noncontinuous or quasi-continuous three-point switching member 2. The nature of such a switching member is that if the input exceeds a threshold a in one direction, the switching member 2 will provide a positive output signal. And if exceeded in the other direction, a negative output signal. The signals are provided as pulses of minimum duration. Such three-point switching members are available commercially or alternatively can be constructed utilizing a pair of comparators with appropriate reference inputs at the threshold level. The output of the switching member 2 is the input to an integrating positioning drive, i.e., an electric motor. It is shown in the figure more generally as an integrator since the present invention is generally applicable to integrating drives with transmissions containing backlash and not limited to an electric motor. However, in a typical embodiment, drive 3 will be an electric motor capable of attaining a relatively high speed. The motor is used to drive a control member 5, a damper in the example, through a multistage transmission 4. The multistage transmission is made up of two stages 4' and 4". An electric signal representing the instantaneous position of the control member 5 is fed back to the summing junction 1 in conventional fashion, for example, through the use of a potentiometer. Thus, this first feedback signal y acts as a proportional control input to the summing junction. Coupled to the shaft 6 of the motor 3 is a tachometer 7 which provides an output ẏ which is an electrical signal proportional to the speed or rate of the motor 3. Thus, the signal ẏ is proportional to the positioning rate. This signal is coupled through an amplifier 8 having variable gain to the summing junction 1. For a given system, the setting of the gain is chosen so that the positioning motor is switched off before the desired position of the control member 5 is reached and the desire position then reached due to the lag of the positioning motor. It will be recognized that in any given system the lag, or overshoot, can be easily determined and the gain of amplifier 8 adjusted so that the signal developed in the motor at high speed will be just enough to equal the change in the signal y which will occur between that position and the point where the system comes to a complete stop.

The mechanical transmission 4, following the position motor 3, has at least one transmission stage 4' which includes gear backlash. The backlash of this stage 4' or the total backlash if further transmission stages are provided which have backlash, is selected so as to be greater than the sum of the position changes Δy of the control member 5 which occur during startup of the positioning motor until nominal speed is reached and during the slowdown or lag assuming there is no backlash. In order to eliminate possible reactions of the control member 5 on the transmission stages 4' having backlash, the last transmission stage 4", directly ahead of the control member 5 is of self-locking design.

In operation, assume that the system is at rest and that the signal y is equal to the signal $y_s$. This means that the control member 5 is properly positioned. Now, assume that it is desired to reposition the control member 5. For this purpose assume there is a step input change on the input $y_s$. Since $y_s$ is now larger than y, an error signal is generated at the output of the summing junction 1 and supplied to the input of the three point switching member. As long as this error signal is larger than the threshold a, the three point switching member 2 provides an output to turn on the positioning motor. Any occurring backlash is taken up and drive commences. The control member 5 is moved and the signal y changes coming closer to the signal $y_s$. At the same time the signal ẏ increases until the motor reaches its nominal speed at which point the signal remains constant. In effect, these two negative signals y and ẏ are compared with or subtracted from the signal $y_s$ so that when the sum of y and ẏ equal $y_s$, the three point switching member 2 turns off deenergizing the motor. The motor now coasts or runs down. Because of the fact that part of the signal at the input was the signal ẏ, the motor has stopped running before the desired position has been reached. As the motor slows down the signal ẏ will decrease and the signal y increase, so that, if the gain of the amplifier 8 was properly selected, at the time the motor stops, y will be exactly equal to $y_s$ in magnitude.

If one considers the case where there was no backlash and where the change in the input $y_s$ is less than the sum of the position changes of the control member caused by starting up and lag, it can be seen that the controller would switch back and forth between the two positioning directions, if the threshold of the three point switching member was set lower than the sum of the positioning changes due to starting up and lag. It is assumed that, as is conventional in such systems, the three point switching member is adapted to output a signal of minimum duration equal to the startup time to prevent the problems with arcing and overheating mentioned above. Thus, assume there was no backlash and the threshold was set down to 0. The smallest change in $y_s$ would result in an output of minimum duration from the threepoint switching member. This minimum duration would result in the motor coming up to speed and travelling a distance corresponding to the time required to come up to speed. Then the motor would be switched off and would continue to run in the lag period. This would result in an overshoot and the error between y and $y_s$ would be in the opposite direction resulting in a pulse of the opposite polarity out of the switching member driving the motor in the opposite direction. An oscillation about the desired position would thus occur. By increasing the threshold a to an amount equal to the sum of the position change during starting up and the position change during lag, this problem would be overcome, but the resolution would be greatly decreased. The same problem occurs to a lesser degree if there is only a small amount of backlash.

However, if, according to the present invention the transmission backlash is greater than the sum of the position change due to starting up plus the position change due to lag, this does not occur. It is necessary to consider two different cases. Consider first the case where the direction of movement is opposite to the previous direction of movement. Here, backlash becomes a factor. The threshold can be reduced as much as desired even down to 0. Now, with a very small change, an output occurs. However, during the time the motor is getting up to speed, it is simply taking out the backlash. At the same time, the rate signal is increasing so that even if at the time it reaches its desired speed the input indicates it is time to switch off, it will not overshoot the desired position, since even at switch off all of the backlash will not be taken up, the motor will continue to run, take out the remaining backlash and then continue to move a slight additional amount bringing the control member 5 into the proper position. On the other hand, if a change occurs in the same direction there will be no backlash to be taken up and overshoot will occur. This overshoot will result in an error in the opposite direction. Now, when positioning back, the backlash is present and operation will be just as described above with the control member 5 reaching its proper position without a continual osciallation about this position. In other words, depending on the previous direction of movement the proper position will either be achieved on the first try, or with one overshoot. Thus, the resolution of the positioning tavel is determined only by the magnitude of the response threshold a of the three point switching member which may theoretically be brought to 0. Of course, if brought to 0 there can be constant switching for small changes. Thus, in practice a compromise between a switching frequency and positioning travel resolution will have to be made in such a way that the resolution of the positioning travel is about 0.05 to 0.1% of the positioning range, these values being sufficient for control purposes.

Figure 2:
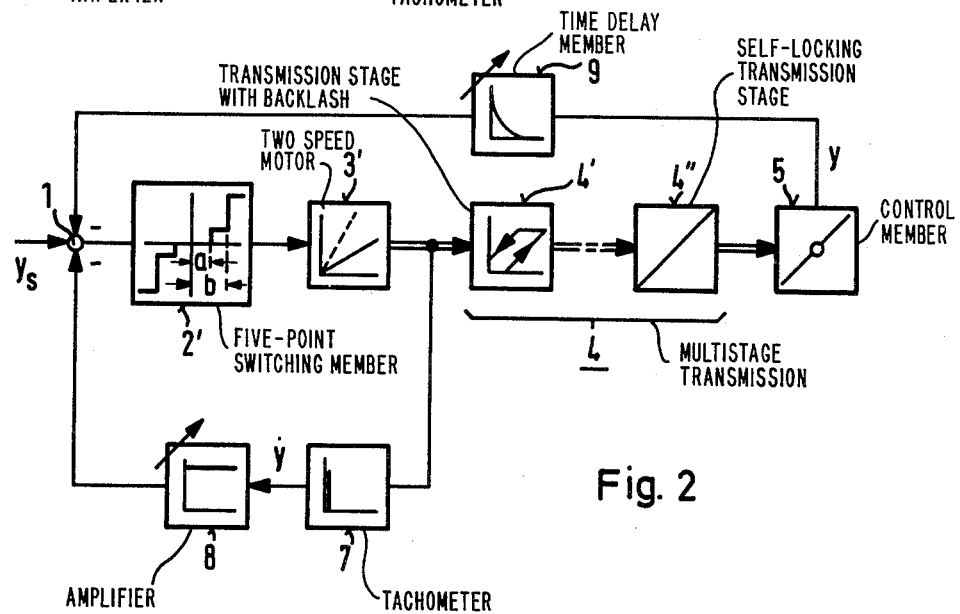
FIG. 2 is a similar diagram of a second position control loop for controlling a motor capable of driving at two different speeds.

Additional improvement in positioning behavior can be used by having a two speed positioning drive. Pole-changeable electrical motors are frequently used for this purpose as are motors supplied with different frequencies. A block diagram of such a control system is illustrated by FIG. 2. Parts which are identical to those described in connection with FIG. 1 are given the same reference numerals. In the system illustrated in FIG. 2, the position feedback to the summing junction 1 is not a direct feedback but is coupled through an adjustable time delay member 9, e.g., an RC circuit with a variable resistor. In this system, a five point switching member 2' having two response thresholds a and b is used. The higher response threshold b provides an output to the motor causing it to operate at its high positioning velocity and the lower response threshold a causes the motor to operate at its lower positioning velocity. Since the lag of the positioning motor depends essentially on its rotary energy, this lag as well as startup time is comparatively small at the low positioning velocity. As a result, the response threshold a of the five point switching member 2' can also be set very low. This leads to a high resolution of the positioning drive. For large, step-like changes of the input variable $y_s$, which are above the response threshold b, the high positioning velocity which is then selected leads to extremely short positioning times. Positioning times on the order of 1 s for the entire positioning range can be realized, while at the same time positioning travel resolution at the low positioning velocity, which is selected by adjusting the response threshold a, can be set to be better than 0.1% of the positioning range.

What is claimed is:

1. In a control device having an integrating positioning drive with a transmission backlash and lag, the device having a first feedback signal proportional to the position of a control member which is driven by the positioning drive, the improvement comprising:
   (a) means for providing a second feedback signal which is proportional to the positioning rate and which is scaled by a scaling factor proportional to the lag of the positioning drive; and
   (b) a transmission having an amount of backlash which is greater than the sum of the position change of the control member which would occur, during the starting of the positioning motor from stand-still until nominal speed is reached, plus the position change during said lag of the positioning drive, if the drive had no backlash.

2. The improvement according to claim 1 wherein said control device includes a noncontinuous controller having a multipoint switching member, the response threshold of which is lower than the change of the input variable of the control device corresponding to the position change due to starting and lag.

3. The improvement according to claim 2 wherein said positioning drive is one having positioning velocities which can be switched between at least a low positioning velocity and a high positioning velocity and wherein the response threshold set for the low positioning velocity is lower than the change of the input variable of the control device due to starting and lag.

4. The improvement according to claim 1 wherein said positioning drive comprises a positioning motor and at least one transmission stage with backlash followed by a self-locking transmission stage, coupling said positioning motor to said control member.

* * * * *